United States Patent
Gnutzmann

(10) Patent No.: US 9,609,175 B2
(45) Date of Patent: Mar. 28, 2017

(54) METHOD FOR GENERATING PDF TRAPPING OBJECTS WITHOUT KNOWING THE DESCRIPTION OF THE CONTOURS

(71) Applicant: HEIDELBERGER DRUCKMASCHINEN AG, Heidelberg (DE)

(72) Inventor: Frank Gnutzmann, Gettorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/943,563

(22) Filed: Nov. 17, 2015

(65) Prior Publication Data

US 2016/0150126 A1     May 26, 2016

(30) Foreign Application Priority Data

Nov. 20, 2014    (DE) .................. 10 2014 223 676

(51) Int. Cl.
*H04N 1/58* (2006.01)
*G06K 15/02* (2006.01)

(52) U.S. Cl.
CPC ......... *H04N 1/58* (2013.01); *G06K 15/1826* (2013.01); *G06K 2215/0094* (2013.01)

(58) Field of Classification Search
None
See application file for complete search history.

(56) References Cited

U.S. PATENT DOCUMENTS 8,705,136 B2    4/2014    Joergens et al.
2001/0055130 A1    12/2001    Geurts et al.

FOREIGN PATENT DOCUMENTS

DE    102006055587 B4    12/2008

OTHER PUBLICATIONS

Adobe Systems Incorporated: Post Script Language Reference. Third edition. Reading, MA (USA): Addison-Wesley Publishing Company, 1999, Chapter 4, S. 254-257.—ISBS: 0-201-37922-8. URL:https:/www.adobe.com/products/postscript-pdfs-PLRM.pdf.

*Primary Examiner* — Christopher D Wait
(74) *Attorney, Agent, or Firm* — Laurence A. Greenberg; Werner H. Stemer; Ralph E. Locher

(57) ABSTRACT

A method for creating PDF trapping objects from a PDF page description without a known contour description by using a computer for a printing process includes using the computer to generate a colored tiling pattern out of a part of the PDF page description without the top object to be choked, using the computer for clipping with a mask of the background object, using the computer for clipping with the top object or text to limit following frame additions to the top object, using the computer for adding a frame to the top object, using the generated colored tiling pattern as an inner frame between the background object and the top object, using the computer for adding a frame to the top object while activating overprinting of the background in the required object colors and using the computer for inserting the trapped top object into the PDF page description.

9 Claims, 5 Drawing Sheets

METHOD FOR GENERATING PDF TRAPPING OBJECTS WITHOUT KNOWING THE DESCRIPTION OF THE CONTOURS

CROSS-REFERENCE TO RELATED APPLICATION

This application claims the priority, under 35 U.S.C. §119, of German Patent Application DE 10 2014 223 676.2, filed Nov. 20, 2014; the prior application is herewith incorporated by reference in its entirety.

BACKGROUND OF THE INVENTION

Field of the Invention

The present invention relates to a method for creating PDF trapping objects without knowing a description of contours.

The technical field of the invention is the field of electronic reproduction technology.

Trapping refers to a method that is part of the electronic reproduction process for all printing processes and is necessary for high-quality printed products.

When multiple colors are to be printed individually and successively on top of each other in a printing process, the substrate needs to be in perfect alignment in the printing unit because otherwise white rims or holes, also known as gaps, are created at the border between two colors. In practice, it is impossible to ensure perfect alignment at all times. That is why trapping is used.

There are two main aspects of trapping: spread and choke. The one principle that always applies is that the lighter color overlaps the darker color.

Spreading is applied for lighter objects on darker objects. In that process, a thin line is placed around the upper, lighter object, causing the two border areas to overlap. Thus the upper, lighter object is enlarged (i.e. spread) in an outward direction in the printed colors that are darker than the background color.

Choking is the opposite process: it is used for dark objects located on lighter objects. An inner frame is placed on the dark, upper object. In that case, too, the border areas overlap, but the darker, upper object is narrowed (i.e. choked) in the printed colors that are lighter than the background color.

There are various options of implementing the trapping process both in terms of the process and in terms of the point in time during the production process. For instance, DTP application such as Adobe InDesign, Scribus, or QuarkXPress offer built-in trapping engines that carry out trapping automatically once specific pre-settings have been made. In most graphics software, the user may furthermore do manual trapping, including the options of overprinting, spreading, and choking, which in part are additionally used for specific optical effects. Yet in general, trapping in DTP applications is not a good idea because the information needed for that purpose is only known to the print shop that carries out the job. Thus, in modern computer-based workflow systems, trapping is the last step. Trapping may be carried out in the Raster Image Processor (RIP) immediately before the imaging process or preferably as a last workflow step in the PDF file in a document preparation process, ready for prepress. In particular in packaging printing and when highly opaque colors (for instance metallic colors) are used, the trapping step is best left to the specialists of the print shop that carries out the print job.

In particular when PDF documents are used in the DTP process, the options of operations for graphics (cubic Bézier curves) or texts are:
 to fill them with a predefined color space and color value (fill or eofill rule)
 to apply color centrically using a stroke command in a predefined width
 to use the graphic or text as a clipping object, usually for images or color gradients (smooth shades).

In that way, it is possible to create simple trapping objects by combinations of clip and stroke commands when the trap has a constant color throughout. In that way, spreading may be implemented by clipping, with the mask of the trapping partner located underneath and by stroking in the trapping color of the object located on top (i.e. the text, for instance). Spreading may also be achieved in images or color gradients located underneath through the use of overprinting individual color separations.

The problem is choking texts in images or color gradients located underneath. If a darker text is located on a lighter image, an inner frame needs to be created for the text. In the frame, individual color separations stem from the image and other separations need to be set in the color of the text. Thus on the border of the text, the image needs to shine through in some separations. Since PDF documents do not allow the creation of a clip path by using a stroke command, it is not possible to directly set an image or a color gradient inside the text frame. In the prior art, in order to set images or color gradients in the text frame, clip paths are used as graphic elements by using a contour description of the individual text signs that needs to be obtained from the data of the font.

SUMMARY OF THE INVENTION

It is accordingly an object of the invention to provide a method for generating PDF trapping objects without knowing a description of contours, which overcomes the hereinafore-mentioned disadvantages of the heretofore-known methods of this general type and which allows choking in PDF files for graphic objects by using stroke and clip commands when no contour description is available. No contour description is available, in particular, if the font of the text is not embedded in the PDF and not available in the current environment of the computer that processes the job. In addition, no contour description is available for fonts known as "Multiple Master" fonts. For texts, a later embedding or even a substitution of fonts is to be implementable without running the risk that the trapping descriptions that have been created no longer match the content and thus need to be recalculated.

With the foregoing and other objects in view there is provided, in accordance with the invention, a method for creating PDF trapping objects from a PDF page description without knowing a contour description by using a computer for carrying out a printing process, the method comprising the steps of:
 1. using the computer for generating a colored tiling pattern out of a part of the PDF page description without the at least one object that is to be choked and is located on top;
 2. using the computer for clipping with a mask of the background object;
 3. using the computer for clipping with the at least one object located on top, in particular text, to limit the following frame addition to the at least one object located on top;

4. using the computer for adding a frame to the at least one object located on top using the generated at least one colored tiling pattern in the form of an inner frame between the background object and the at least one object located on top;
5. using the computer for adding a frame to the at least one object located on top with overprinting of the background in the required object colors being activated; and
6. using the computer for inserting the at least one trapped object located on top into the PDF page description.

In this context, a very important aspect is the creation of a colored tiling pattern. That is to say that in addition to the known color spaces (CMYK, RGB, gray etc.), a new color space is created specifically for the background of the object to be trapped—which in most cases is text. This color space may be used like the traditional known color spaces. Colored tiling pattern color spaces may contain any desired PDF content, including images, color gradients, or graphics. This pattern color space contains a part or all of the objects that are located underneath the text, but at the minimum the object in which the choking is to be implemented. The choking may be achieved as follows:
1. Clipping with the mask (text or graphic) of the background object.
2. Clipping with the object located on top (i.e. preferably the text without a known contour description). This clipping step limits the following stroke commands to the object located on top and thus provides an inner frame.
3. Stroking the object located on top using the colored tiling pattern color space. In this way, the required background is created in all separations as an inner frame of the text.
4. Stroking the object located on top while overprinting in the required colors that are to come from the text is activated. In this way, the background is now replaced by text color in selected separations.

When the pattern background color space is created, there is the preferred option of using only a single pattern color space that contains all elements underneath text objects that are to be trapped in this way.

An advantage of this method is that now the choking (i.e. trapping) of texts is possible without knowing the contour descriptions of the text.

In accordance with a preferred further development, the PDF page description is converted into a computer-internal representation in the form of a number of objects to carry out the trapping process.

An advantageous preparatory step in an automated implementation of a trapping process by using a computer is to convert the PDF page description into a form that is more easily readable for a computer. Depending on the programming language that is used, this is generally done in the form of objects, i.e. class-specific instances of a data type.

In accordance with a further preferred development all objects that are located on top of a background object and are to be choked are trapped and this process is carried out for all further background objects and the objects thereof that are to be choked and are located on top.

The trapping process is carried out in that for every background object on which objects to be choked are located (in most cases text), the respective objects located on top are choked by using the associated colored tiling pattern. When this is completed, the objects to be choked for the next background object are processed. The process is continued until all objects to be choked have been processed.

In accordance with a preferred further development of the method of the invention, the object located on top is at least one text without a known contour description.

In particular, the objects to be choked are texts. The choking is carried out with the respective text color. The text has no contour description. The application of the method of the invention to texts without contour description is a fundamental advantage over the prior art.

In accordance with a further preferred development, the object located on top is at least one text with a known contour description.

Although the preferred application of the method of the invention is with texts without any available contour description, the method may also be used for texts with a contour description. In this case the advantage over the prior art is that the trap is generated by using exclusively stroke and clip commands. As compared to the traditional description by using graphic commands, this saves space and results in improved quality proofs of low resolution due to the optimized treatment of the text.

In accordance with a preferred further development of the method of the invention, the colored tiling pattern that has been created contains all background objects that are located underneath all objects that are to be choked and are located on top.

If the colored tiling pattern includes all background objects, one and the same pattern may be used for the entire trapping process, i.e. for all runs. This reduces, in particular, the amount of administrative work involved.

In accordance with a further preferred development of the method, at least one colored tiling pattern is created and the colored tiling pattern that has been created respectively contains at least the background object that is located underneath the at least one object that is to be choked and is located on top.

When the colored tiling pattern is generated, an available option is specifically to pack smaller background regions into a pattern. Then multiple colored tile patterns exist and overlaps may occur in adjacent regions. In this case, care must be taken in the trapping process to use the correct pattern for each background object.

In accordance with a further preferred development of the method of the invention the at least one colored tiling pattern that has been created is located in precisely the old position on the PDF page, the size is freely variable, and the at least one pattern that has been created at least contains the background object that is located underneath the at least one object to be choked and is located on top.

The region included in the creation of the colored tiling pattern of the at least one background object may have any desired size, i.e. it does not have to include the background object(s) or all background objects that contain texts to be choked but only a partial area thereof.

In accordance with a preferred further development of the method of the invention the at least one background object to which the at least one colored tiling pattern that has been created refers covers a rectangular area.

The region of the background object(s) or of all background object(s) to be included to create the colored tiling pattern is best selected in the form of a rectangular section.

Other features which are considered as characteristic for the invention are set forth in the appended claims.

Although the invention is illustrated and described herein as embodied in a method for generating PDF trapping objects without knowing a description of contours, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
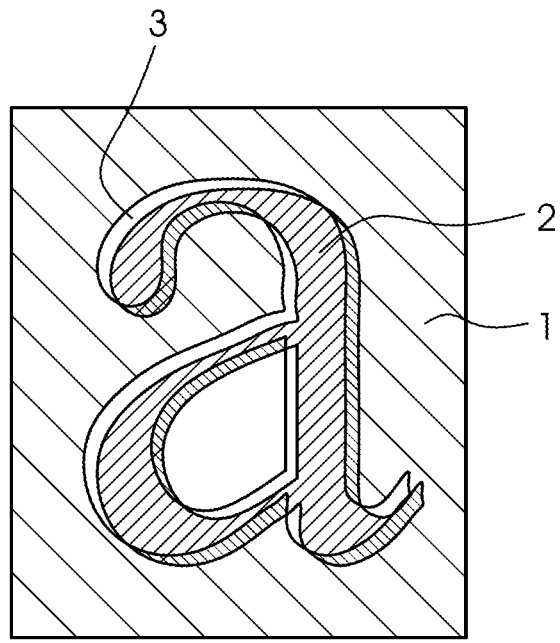
FIG. 1 is a diagrammatic, top-plan view of a text on a background illustrating an example of a gap that has occurred in an image.

Referring now in detail to the figures of the drawings in which corresponding elements have the same reference numerals and first, particularly, to FIG. 1 thereof, there is seen an undesired gap 3, which is clearly visible at a letter "a" where white paper shines through. For a better understanding it is to be understood that the background color is 100% cyan whereas the color of the letter "a" is 100% magenta. A lighter text 2 is located on a darker background 1. Since the print sheets of the two colors are not printed precisely on top of each other but slightly offset, a small region in between remains unprinted. Conversely, the colors cyan and magenta overlap on the other side of the letter, resulting in the creation of a blue tint.

Figure 2:
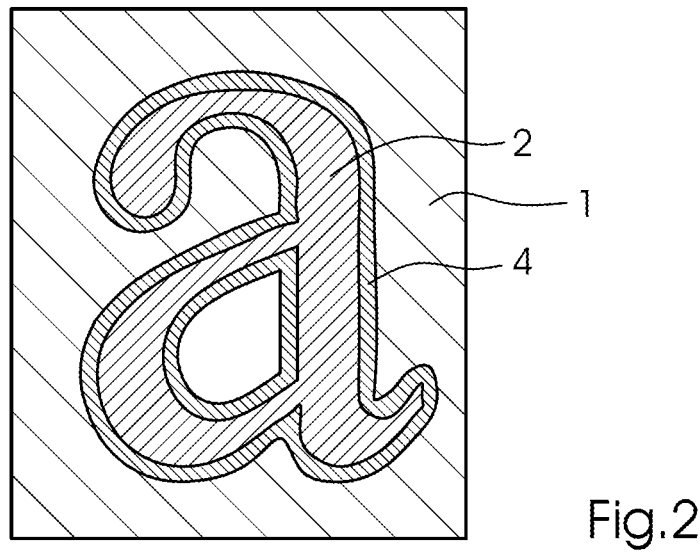
FIG. 2 is a view similar to FIG. 1 illustrating an example of trapping to correct the gap in the image.

In order to eliminate this gap 3, trapping is carried out, in this case spreading 4. The result is shown in FIG. 2. To put it simply, a thin line is placed around the lighter object 2, in this case the letter "a," creating a minimum amount of overlap between the border areas. In this case, the spreading causes the colors cyan and magenta to be printed on top of each other to compensate small alignment errors as long as the offset is not greater than the overlapping region. The amount of overlap depends on the printing process. In modern offset printing, very accurate alignment is possible, whereas screen printing requires more spread to effectively eliminate gaps.

However, in particular for chokes 10, the contour descriptions of the objects to be trapped, mostly text 7, are unknown. In order to nevertheless be able to carry out automatic choking by using a computer 12, a so-called colored tiling pattern color space 5 is created for the light text background 6. Colored tiling pattern color spaces 5 may contain any desired PDF content including images, color gradients or graphics, and are treated as a special color space that may be used like the traditional known color spaces (CMYK, RGB, gray, spot colors . . . ). This pattern color space 5 contains some of the objects 6 or all objects 6 that are located underneath the text 7, but at least the object 6 that is to be choked.

Such a pattern 5 is created as follows: During the automated trapping process, the PDF page description is analyzed and converted into an internal representation. This is formed of a stack of objects, i.e. of instances of different classes in a suitable programming language, which are saved in the original order of the page description and each contain a drawing element of the page. Such drawing objects are images, texts, color gradients or graphics, for instance. The objects always know their positions relative to the page and, depending on the type, among other features, their color, text, font, or graphics and all required parameters of the effective graphic state.

The stack of objects that has been created in this way allows the content of a PDF page to be reproduced in its entirety or in parts in such a way that the content completely or partly corresponds to the original content. In the PDF, a page description is formed of a so-called content stream (a series of commands, coordinates or other instructions) and the associated resource elements (images, fonts, color spaces, or color gradients among others).

During the trapping process, objects that are in contact with each other are examined in terms of whether traps are required, depending on their color and the selected trapping rules. Traps are inserted in the stack of objects as new objects, which are accordingly marked as trap objects that also know the relevant original objects, for instance. If in this process it is found that traps need to be made by using colored tiling patterns 5, the region in question is marked as a rectangle 11 and initially a preliminary trap description is created internally. When the trapping process has been completed, the stack of objects is asked to create one or more page descriptions for all regions concerned. In this page description, all objects that are not required for this specific purpose are left out, i.e. all trap objects that have been created so far, all objects that are completely outside the required rectangular area 11, and all objects for which these special pattern traps are to be created. Just like a regular PDF page, a colored tiling pattern 5 is formed of a content stream and the resources required therein and may thus easily be created from the data that have just been generated. The bounding box of the pattern required for this purpose corresponds to the requested rectangular area 11 of the page. The tiling pattern color spaces 5 that have been created in this way are inserted into the pattern resource of the original page and the preliminary trap descriptions may now be completed by adding the corresponding pattern name.

The colored tiling patterns 5 that have been created in this way may now be used to carry out the choking 10. A flow chart of this process is diagrammatically shown in FIG. 3.

The preferred embodiment of the method described therein is further illustrated in FIGS. 4 to 8.

Figure 4:
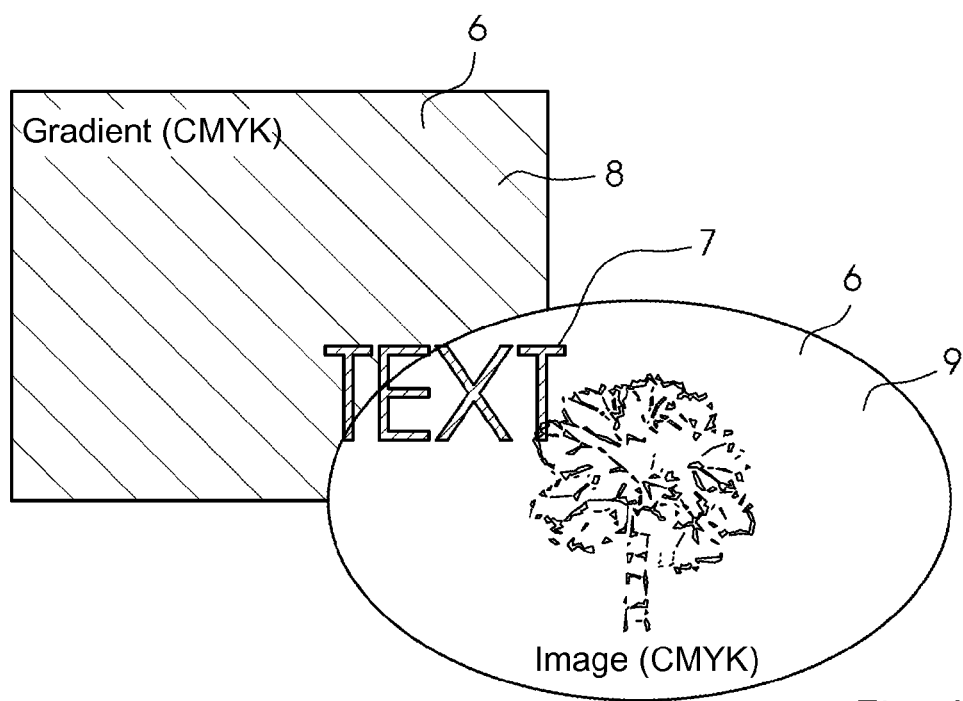
FIG. 4 is a top-plan view of a sample graphic of a document having background objects for the implementation of the method of the invention.
Figure 5:
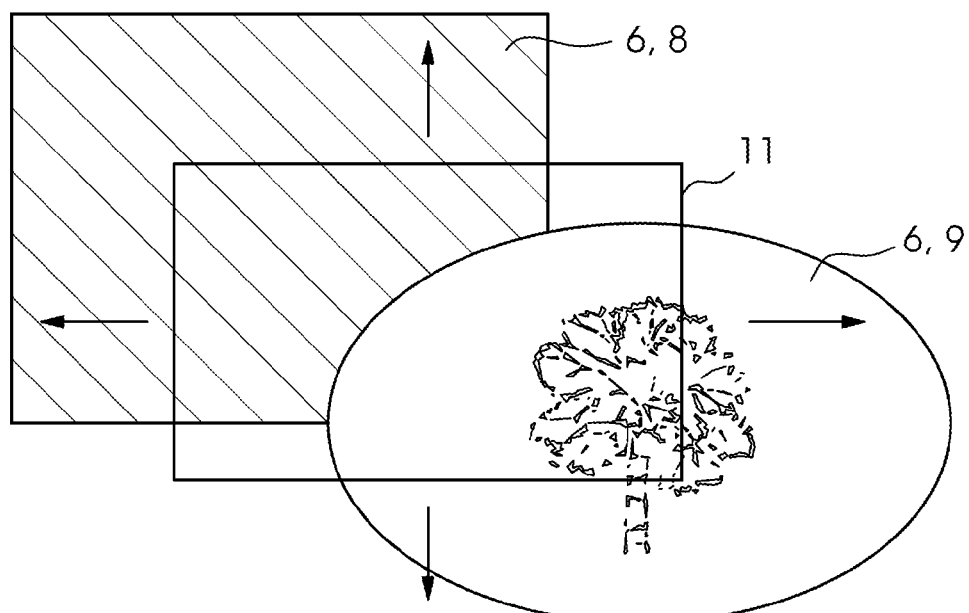
FIG. 5 is a view similar to FIG. 4 of a diagram for the generation of a colored tiling pattern color space.

FIG. 4 illustrates an exemplary PDF document having two background objects 6 (background gradient 8 and background image 9) as well as a text that extends over both backgrounds 6. A text 7 (100% K, 0% CMY) is to be choked into gradient 8 (smooth shade) and image 9 using the CMY colors of the objects 6 located underneath. The font 7 is not embedded and no contour description is available. A contour graphic is available for the image 9 and the gradient 8.

Figure 3:
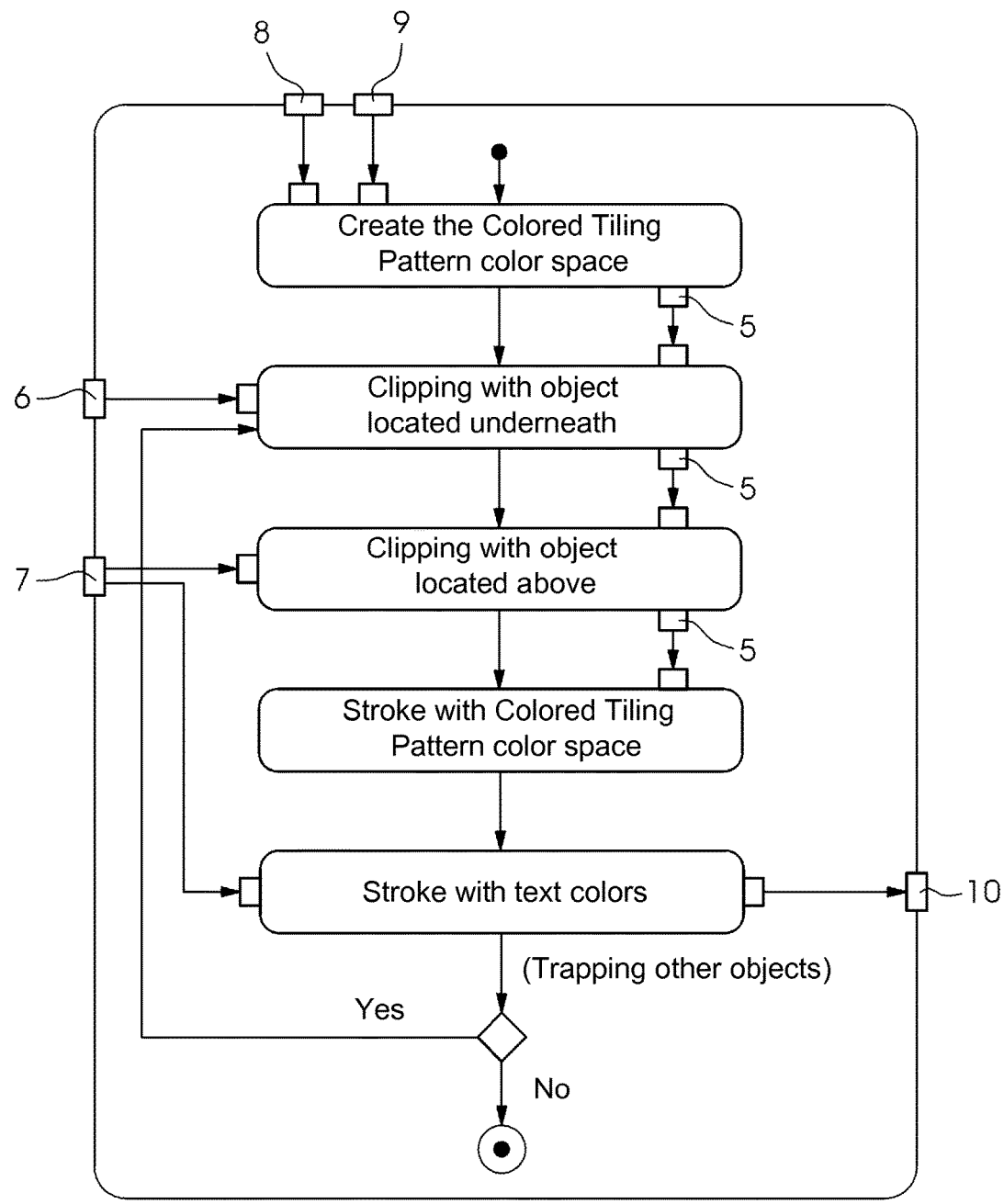
FIG. 3 is a flow chart of the method of the invention.

As is shown in the flow chart of FIG. 3, in a first step, the colored tiling pattern 5 is created. The manner in which this is technically done has been described above. For the current exemplary embodiment, the colored tiling pattern is created from a part of the page description without the texts to be choked. This preferably includes the region underneath all texts 7 to be trapped (see FIG. 5). The resultant pattern 5 may be composed of all elements available in the PDF document. What is important is that the pattern 5 is created so as to be correctly and properly positioned with respect to the original position on the page. A colored tiling pattern 5 has a freely definable size and a description of the associated elements. This "tile" 11 is repeated in all directions.

Two clip commands are placed in order to choke the text 7 into the gradient 8:
Clip No. 1: gradient mask minus image mask,
Clip No. 2: text clip.

Figure 6:
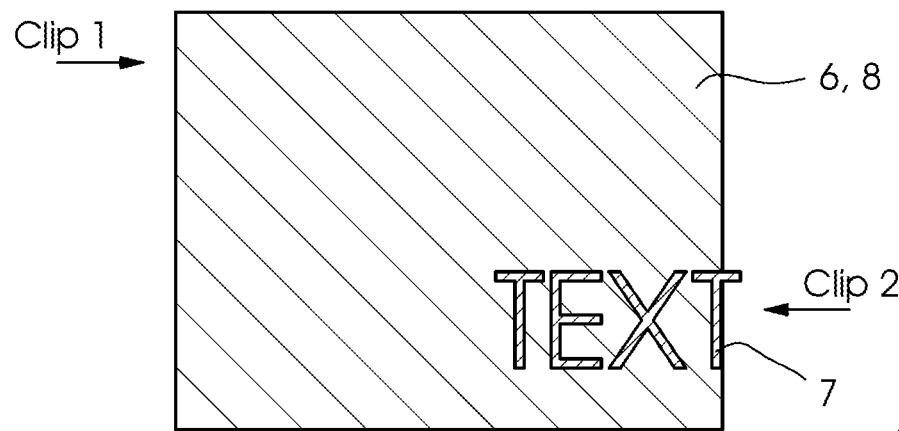
FIG. 6 is a top-plan view illustrating a clipping result for text above the gradient.

The result is shown in FIG. 6. The following text stroke commands only become effective in the overlap of both clips, i.e. in the text region located above the gradient 8. The two clip commands and the subsequent stroke commands are only carried out across the gradient background 8 and across the text 7 located above the gradient. The text 7 above the image background 9 is choked in a second run of the process.

Figure 7:
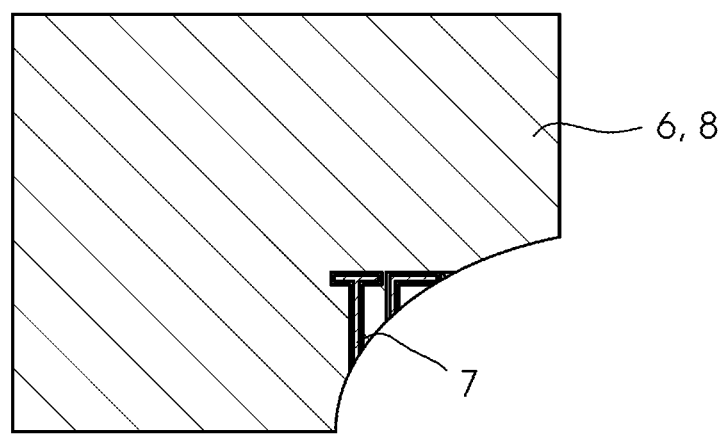
FIG. 7 is a view similar to FIG. 6 illustrating a stroking result for text above the gradient.

In the next step, a text stroke command is placed in the desired double trapping width. In this process, the previously created pattern color space 5 is set as the stroke color. As is shown in FIG. 7, in the border region of the text 7 located above the gradient 8, the text has been covered in an inward direction with the smooth shade located underneath. Thus optically, the text 7 is narrowed by the trapping width, which is classical choking behavior 10.

Figure 8:
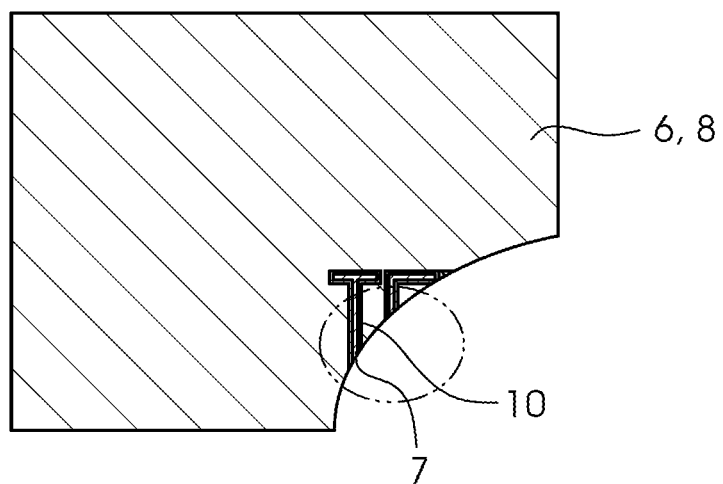
FIG. 8 is a view similar to FIG. 7 illustrating a choking result.
Figure 8A:
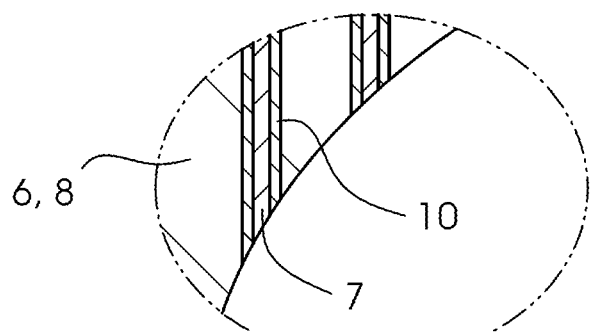
FIG. 8A is an enlarged section of the result for better illustration.

In a last step, another text stroke command is placed. The separations of the text 7 that are to be effective in the choke 10, which are the text color black in the illustrated example, are taken as the overprinting stroke color. The result is shown in FIG. 8: the black separation of the text 7 now covers the pattern 5 lying underneath. FIG. 8A illustrates a section of the desired result, including the choked text 10. In the border region of the text 7 within the gradient 8, CMY come from the gradient and K comes from the text.

The choking 10 for the image background 9 is implemented in an analogous way using the same colored tiling pattern color space 5.

The completely trapped image available in digital form in the computer 12 may now be used for the printing process.

The invention claimed is:

1. A method for creating PDF trapping objects from a PDF page description without knowing a contour description by using a computer for implementing a printing process, the method comprising the following steps:
   using the computer to generate a colored tiling pattern out of a part of the PDF page description without at least one object located on top to be choked;
   using the computer for clipping with a mask of a background object;
   using the computer for clipping with the at least one object located on top, or a text, to limit following frame additions to the at least one object located on top;
   using the computer for adding a frame to the at least one object located on top using the at least one generated colored tiling pattern in the form of an inner frame between the background object and the at least one object located on top;
   using the computer for adding a frame to the at least one object located on top while activating overprinting of a background in required object colors; and
   using the computer for inserting the at least one trapped object located on top into the PDF page description.

2. The method according to claim 1, which further comprises converting the PDF page description in the computer into an internal representation in the form of a number of objects to implement the trapping process.

3. The method according to claim 2, which further comprises trapping all objects located on a background object and to be choked and located on top and trapping all further background objects and their objects to be choked and located on top.

4. The method according to claim 1, wherein the object located on top is at least one text without a known contour description.

5. The method according to claim 1, wherein the object located on top is at least one text with a known contour description.

6. The method according to claim 1, wherein the colored tiling pattern that has been created contains all background objects that are located underneath all objects that are to be choked and are located on top.

7. The method according to claim 1, which further comprises creating at least one colored tiling pattern, each created color tiling pattern containing at least the background object that is located underneath the at least one object that is to be choked and is located on top.

8. The method according to claim 1, which further comprises accurately positioning the at least one colored tiling pattern that has been created relative to an original position in the PDF page, wherein a size is freely variable, and wherein the at least one colored tiling pattern that has been created contains at least the background object that is located underneath the at least one object to be choked located on top.

9. The method according to claim 1, which further comprises covering a rectangular area with the at least one background object to which the at least one colored tiling pattern that has been created refers.

* * * * *